United States Patent [19]

Benajam

[11] 4,337,991
[45] Jul. 6, 1982

[54] LIGHT MICROSCOPE WITH A PLURALITY OF SLIDEWAYS

[75] Inventor: Alain C. Benajam, Bobigny, France

[73] Assignee: Le Materiel Biomedical, Paris, France

[21] Appl. No.: 191,540

[22] Filed: Sep. 29, 1980

[51] Int. Cl.³ .............................................. G02B 21/24
[52] U.S. Cl. ...................................................... 350/87
[58] Field of Search ............................. 350/82, 85–87; 356/39

[56] References Cited

U.S. PATENT DOCUMENTS

| | | | |
|---|---|---|---|
| 373,634 | 11/1887 | Bausch | 350/87 |
| 1,458,143 | 6/1923 | Muller | 350/87 |
| 3,799,645 | 3/1974 | Stankewitz | 350/87 |
| 3,934,960 | 1/1976 | Ouchi et al. | 350/87 |
| 4,035,057 | 7/1977 | Klein | 350/85 |
| 4,063,797 | 12/1977 | Taira | 350/87 |
| 4,148,552 | 4/1979 | Suzuki et al. | 350/87 |
| 4,210,384 | 7/1980 | Meyer et al. | 350/50 |

FOREIGN PATENT DOCUMENTS 414324  8/1934  United Kingdom .................. 350/87

Primary Examiner—Jon W. Henry
Attorney, Agent, or Firm—Fisher, Christen & Sabol

[57] ABSTRACT

The present invention relates to a light microscope comprising a framework supporting a plate which in turn supports the object to be observed, an optical system of observation and a lighting system.

In the microscope according to the invention the said optical system of observation and the said lighting system are mounted on the framework so that each one can be placed either above or under the said plate.

The invention finds an application in the viewing of microscopic objects from above and from beneath.

3 Claims, 7 Drawing Figures

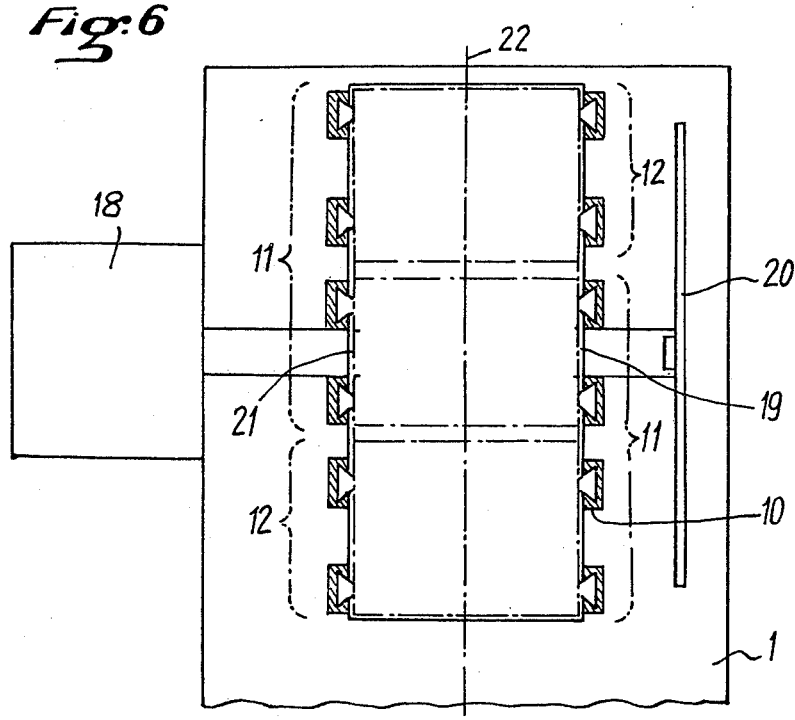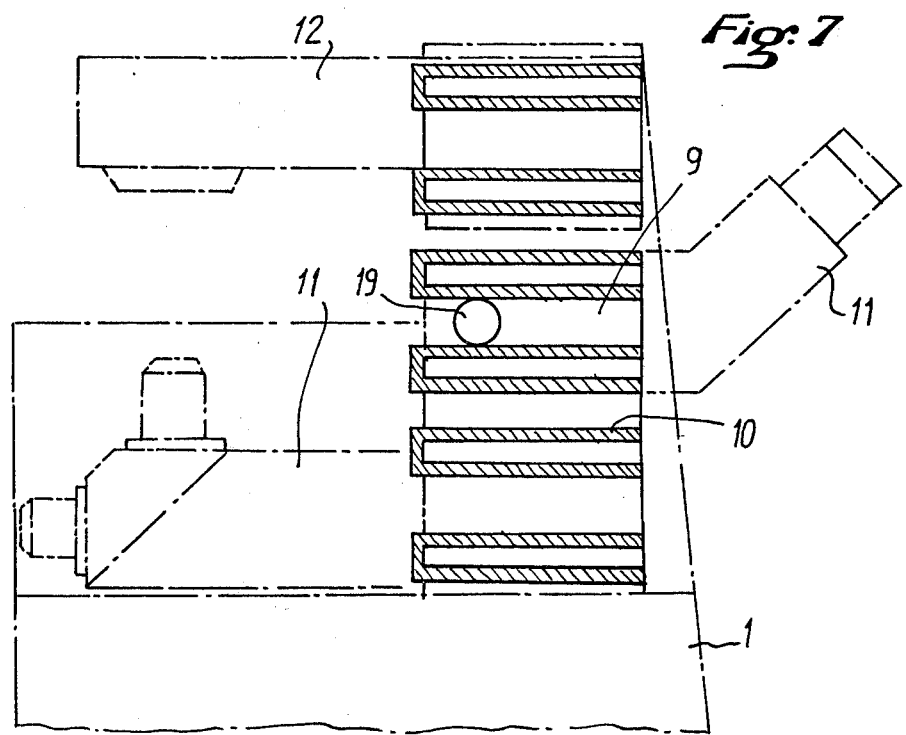

LIGHT MICROSCOPE WITH A PLURALITY OF SLIDEWAYS

The present invention relates to light microscopes.

Already existing light microscopes are known to comprise, in general, a plate supporting the object to the observed, a source of lighting being provided under the said plate, whereas the optical system of observation is placed above the latter. In this way, the object can be viewed from above, by transparency.

Such an observation method is satisfactory when the object under observation is thin and when no light-absorbing layer is interposed between the said object and the optical system of observation. It is no longer so when for example, the object to be observed is composed of agglomerates collected at the bottom of a container and covered by a more or less opaque liquid, as it is known to happen with a large number of biological tests. Indeed, the liquid in this case, becomes a serious obstacle to an accurate observation.

In order to overcome this type of disadvantages, it has already been proposed to build light microscopes in which the light source is placed above the plate supporting the object to be observed, whereas the optical system of observation is placed beneath the said plate. Then the object can be observed from beneath, by transparency. It is obvious that in a case such as mentioned above of agglomerates collected at the bottom of a container, the said bottom should be transparent.

Thus microscopes are already known for viewing an object by transparency from above and microscopes for viewing an object by transparency from beneath. But the structures of these known microscopes are rigid, so that a microscope of the first type can only be used for viewing from above and a microscope of the second type can only be used for viewing from beneath. Yet, when performing many techniques, it is necessary to be able to view the objects from above and from beneath, this implying the necessity of owning microscopes of both types, and resulting in high investment costs and in a duplication of the volume occupied by the microscopic observation device.

It is the object of the present invention to overcome these disadvantages and to propose a microscope adapted to allow the viewing of an object from above and from beneath.

To this end, the microscope according to the invention, of the type comprising a framework supporting a plate which in turn supports the object to be observed, an optical system of observation and a lighting system, is remarkable in that the said optical system of observation and the said lighting system are mounted on the said framework so that each one can be placed either above or under the said plate.

It is then possible to view the object supported by the plate either from above or from beneath.

The optical system of observation and the lighting system could be integral one with the other so that when one is placed above the plate, the other is automatically placed underneath, and vice versa. It is however advantageous if the optical system of observation and the lighting system are independent one from the other and interchangeable: thus, by providing several different and interchangeable optical systems of observation and several different and interchangeable lighting systems, it becomes possible to combine, for one give observation, an optical system of observation with a lighting system which are particularly appropriate to the observation, and adapted one to the other.

Preferably, each optical system of observation and each lighting system are provided in the form of removable and reversible slides, adapted to fit into the framework, said latter comprising supporting means and sliding means for the said slides, so that it is always possible to place an observation slide above the plate and a lighting slide beneath it, or vice versa. Advantageously, the sliding directions of the said slides are horizontal and preferably parallel. In one advantageous embodiment of the invention the observation and lighting slides can be fitted into the framework and removed therefrom by a horizontal translational movement, from the face thereof which is opposite the plate.

The microscope according to the invention can, in known manner, be equipped with more than one automatic device for analyzing the image of the object under observation as well as a fluorescence epicondenser lighting device connected to the optical system of observation. In this case, it is advantageous if, in every observation slide, the video output towards the image pick-up means of the image analyzing automatic device and the input connected to the fluorescence epicondenser lighting device are identical and symmetrical, so as to be interchangeable when the optical slide is reversed from a viewing position from above to a viewing position from beneath, so that the fluorescence epicondenser lighting device and the said image pick-up means can be fixedly mounted on the said framework, on either side of the vertical median plane of the said observation slide.

The invention will be more readily understood on reading the following description with reference to the accompanying drawings in which:

FIG. 6 is a diagrammatical cross-section along VI—VI of FIG. 1.;

FIG. 7 is a diagrammatical longitudinal section alone VII–VII of FIG. 1.

In all these figures, identical references are given to designate identical elements.

Figure 1:
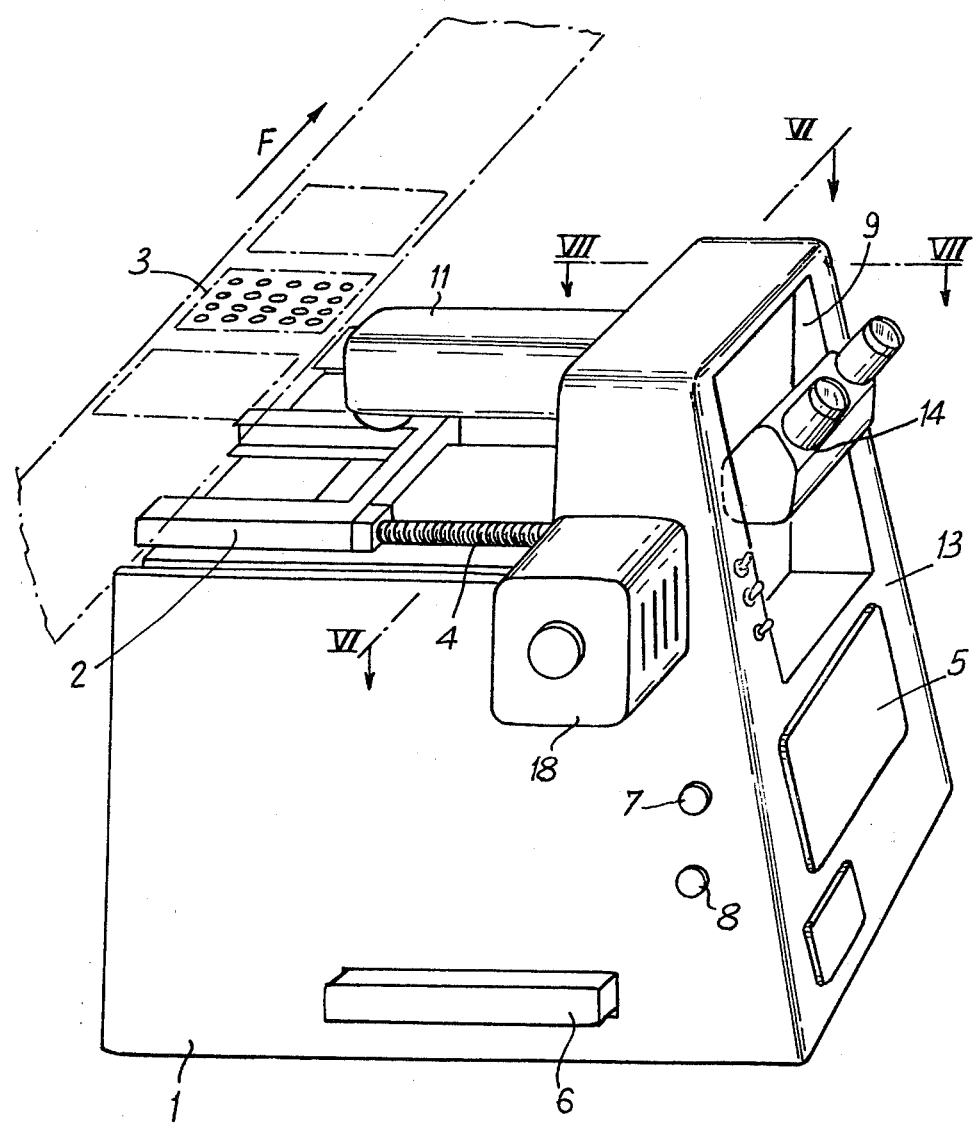
FIG. 1 is a perspective view of an embodiment of the microscope according to the invention.

The microscope according to the invention illustrated in these Figures comprises a framework 1, on which is mounted a plate 2 designed to support the objects to be observed. This microscope is for example meant for an automatic image analysis of platelets 3 moving stepwise in front of the said microscope and provided with a plurality of reaction cells. Said platelets can be mounted on the said plate 2 by means not shown. Likewise, for the automatic setting of the microscope and automatic scanning of the images, the plate 2 is mounted so as to move vertically and horizontally with respect to the framework 1 through the action of step-by-step motors housed inside the said framework and therefore invisible, and through the action of endless screws, one of which only, with the reference 4, can be seen in FIG. 1.

The image is analyzed by a television monitor 5, according to a programme contained in a cassette 6. Knobs 7, 8 are also provided to permit a manual setting.

The framework 1 comprises a through opening 9, inside which are provided horizontal slide guides 10, dovetail-shaped for example, for sliding in slides 11 which contain the optical system of observation and slides 12 which contain the lighting system. The opening 9 is directed, from a face 13 of the framework oriented to face the observer, towards the movable plate 2.

The slides 11 and 12 are interchangeable and each one is reversible and can be oriented upwards or downwards.

Figure 2:
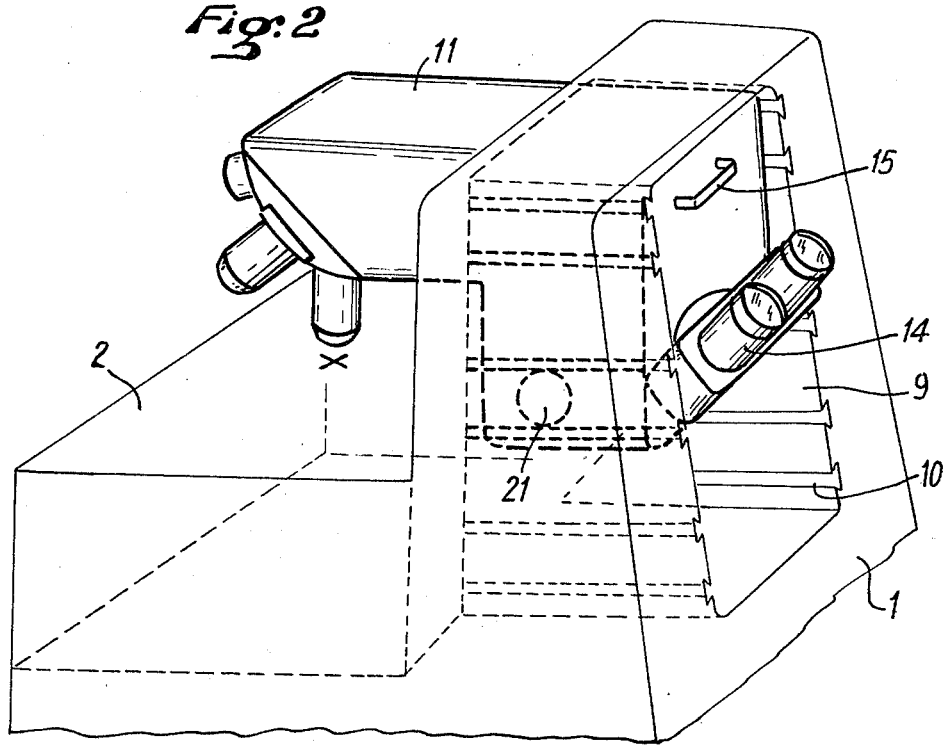
FIG. 2 is a perspective diagrammatical view of an observation slide, fitted in the framework of the microscope for a viewing from above.
Figure 3:
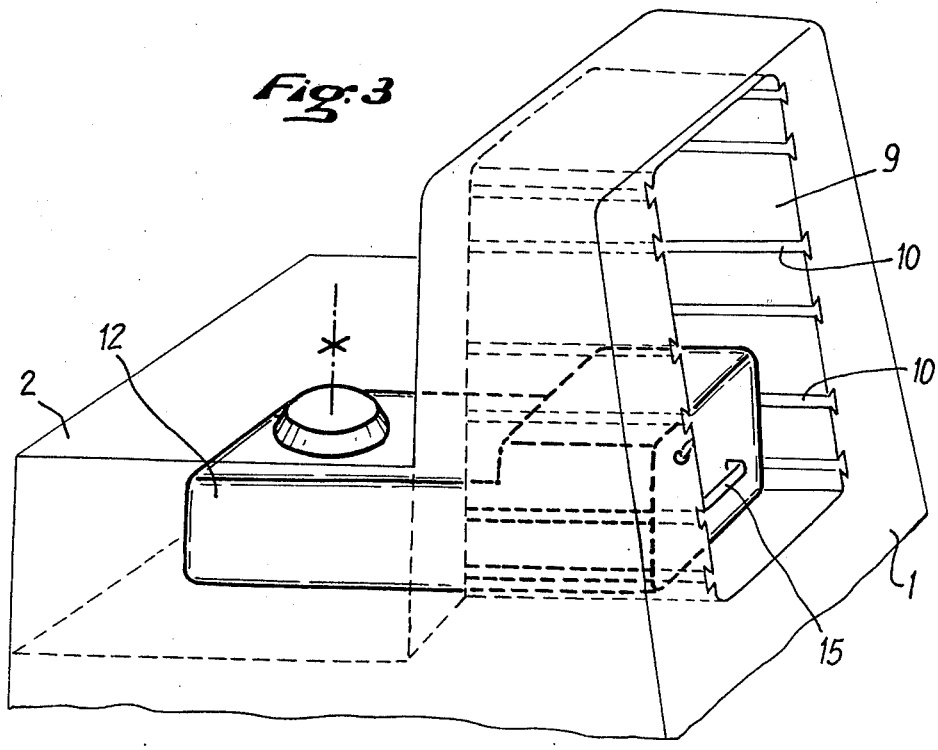
FIG. 3 is a perspective diagrammatical view of a lighting slide, fitted in the framework of the microscope for a viewing from above.
Figure 4:
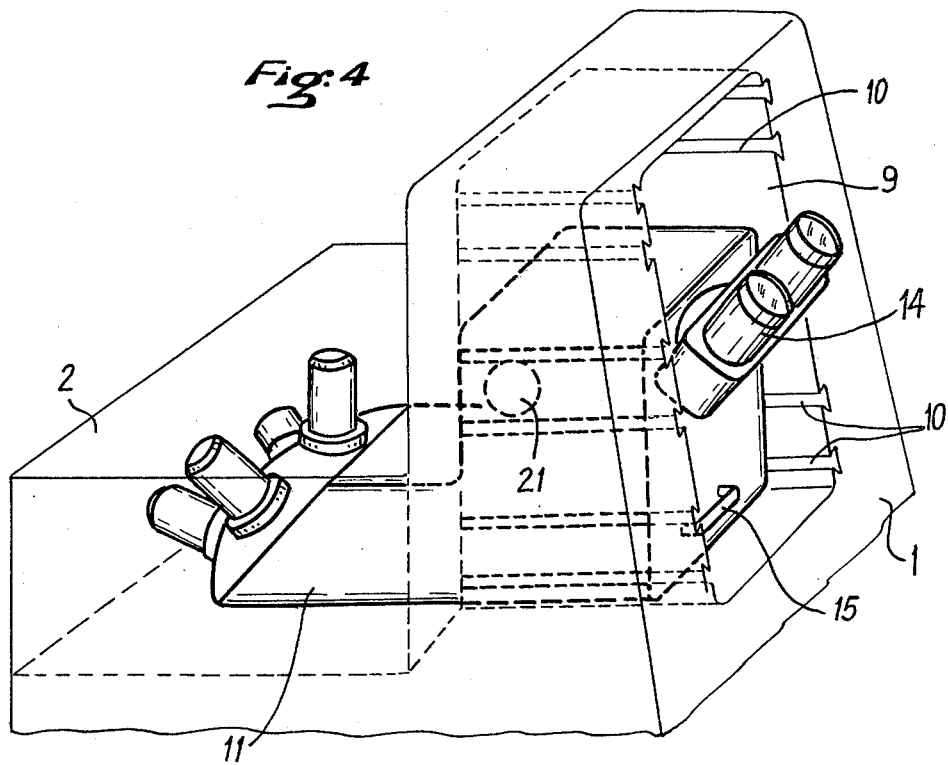
FIG. 4 is a perspective diagrammatical view of an observation slide, fitted in the framework of the microscope, for a viewing from beneath.
Figure 5:
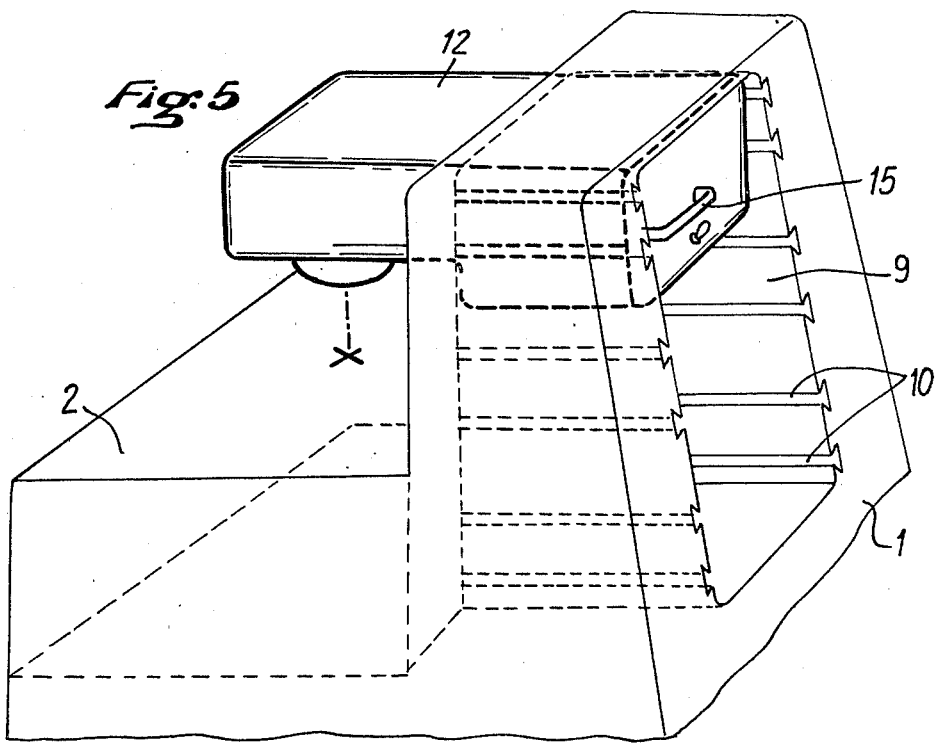
FIG. 5 is a perspective diagrammatical view of a lighting slide, fitted in the framework of the microscope for a viewing from beneath.

The slide guide (10) system and the slides 11 and 12 are provided so that when an observation slide 11 is fitted in above the plate 2 (See FIG. 2), a lighting slide 12 can be fitted in under the plate 2 (See FIG. 3), whereas when an observation slide 11 is fitted in under the plate 2 (See FIG. 4), a lighting slide 12 can be fitted in above the said plate (See FIG. 5). It is therefore obvious that the microscope according to the invention can be used for observation, by transparency, from above and from beneath, by simply exchanging the positions of the slides 11 and 12. It suffices for the binocular 14 of the slides 11 to be able to effect a rotation of 180°.

Handles 15 can be provided on the slides 11 and 12 for handling purposes.

Also, when the microscope according to the invention is fitted with a supplemental lighting device 18 by reflection, provisions are made on each slide 11, for the video output 19 towards the image pick-up means 20 of the image analyzing automatic device, and the input 21 connected to the lighting device 18, to be identical and symmetrical with respect to the vertical median plane 22 of the said slide 11 (See FIG. 6). Thus, the output 19 and the input 21 are interchangeable when the said optical slide is moved from a position of observation from above to a position of observation from beneath and, if the slide guide system 10 is appropriately adapted, the lighting device by reflection 18 and the image pick-up means 20 can be permanently fixed on the framework 1, on either sides of the vertical plane 22.

What is claimed is:

1. Optical microscope comprising: framework means for supporting a plate on which an object to be observed is supported;
   a first assembly comprising optical elements for viewing said object;
   a second assembly comprising lighting elements for illuminating said object;
   said first and second assemblies being independent from one another, each assembly being provided with reversible mounting slides, said framework means being provided with a plurality of slideways for interchangeably receiving said slides for alternatively mounting said first assembly above or below said object and for alternatively mounting said second assembly on the side of said object opposite from the side on which the first assembly is mounted.

2. Optical microscope according to claim 1, wherein said slideways are disposed in vertically spaced parallel horizontal planes.

3. Optical microscope according to claim 2, wherein said object supporting plate is disposed on one side of said framework means and said slideways extending inwardly from the opposite side of the framework means to permit horizontal insertion and removal of said assemblies from said opposite side.

* * * * *